United States Patent
Peleg et al.

(10) Patent No.: US 10,475,465 B2
(45) Date of Patent: Nov. 12, 2019

(54) METHOD AND SYSTEM FOR ENHANCING A SPEECH SIGNAL OF A HUMAN SPEAKER IN A VIDEO USING VISUAL INFORMATION

(71) Applicant: Yissum Research Development Company of The Hebrew University of Jerusalem Ltd., Jerusalem (IL)

(72) Inventors: Shmuel Peleg, Mevaseret Zion (IL); Asaph Shamir, Jerusalem (IL); Tavi Halperin, Tel-Aviv (IL); Aviv Gabbay, Jerusalem (IL); Ariel Ephrat, Jerusalem (IL)

(73) Assignee: Yissum Research Development Company, of The Hebrew University of Jerusalem Ltd., Jerusalem (IL)

( * ) Notice: Subject to any disclaimer, the term of this patent is extended or adjusted under 35 U.S.C. 154(b) by 0 days.

(21) Appl. No.: 16/026,449

(22) Filed: Jul. 3, 2018

(65) Prior Publication Data

US 2019/0005976 A1      Jan. 3, 2019

Related U.S. Application Data

(60) Provisional application No. 62/528,225, filed on Jul. 3, 2017, provisional application No. 62/586,472, filed
(Continued)

(51) Int. Cl.
*G10L 21/02*    (2013.01)
*G10L 25/30*    (2013.01)
(Continued)

(52) U.S. Cl.
CPC ...... *G10L 21/0205* (2013.01); *G06K 9/00228* (2013.01); *G06K 9/00523* (2013.01);
(Continued)

(58) Field of Classification Search
None
See application file for complete search history.

(56) References Cited

U.S. PATENT DOCUMENTS 9,721,202 B2 *   8/2017   Boulanger-Lewandowski ............
                                                G06N 3/0445
2003/0160944 A1 *   8/2003   Foote ..................... G03B 31/00
                                                352/1

(Continued)

OTHER PUBLICATIONS

International Search Report of PCT Application No. PCT/IL2018/050722, dated Oct. 25, 2018.
(Continued)

*Primary Examiner* — Abul K Azad
(74) *Attorney, Agent, or Firm* — Pearl Cohen Zedek Latzer Baratz LLP

(57) ABSTRACT

A method and system for enhancing a speech signal is provided herein. The method may include the following steps: obtaining an original video, wherein the original video includes a sequence of original input images showing a face of at least one human speaker, and an original soundtrack synchronized with said sequence of images; and processing, using a computer processor, the original video, to yield an enhanced speech signal of said at least one human speaker, by detecting sounds that are acoustically unrelated to the speech of the at least one human speaker, based on visual data derived from the sequence of original input images.

24 Claims, 14 Drawing Sheets

Related U.S. Application Data on Nov. 15, 2017, provisional application No. 62/590,774, filed on Nov. 27, 2017.

(51) Int. Cl.

| | | |
|---|---|---|
| *G10L 21/0232* | (2013.01) | |
| *G10L 25/18* | (2013.01) | |
| *G10L 25/78* | (2013.01) | |
| *G10L 21/0216* | (2013.01) | |
| *G10L 25/57* | (2013.01) | |
| *G06K 9/00* | (2006.01) | |
| *G06K 9/46* | (2006.01) | |
| *G06K 9/62* | (2006.01) | |
| *G10L 21/0272* | (2013.01) | |

(52) U.S. Cl.
CPC ........... *G06K 9/4628* (2013.01); *G06K 9/627* (2013.01); *G06K 9/6289* (2013.01); *G10L 21/0216* (2013.01); *G10L 21/0232* (2013.01); *G10L 21/0272* (2013.01); *G10L 25/18* (2013.01); *G10L 25/30* (2013.01); *G10L 25/57* (2013.01); *G10L 25/78* (2013.01)

(56) References Cited

U.S. PATENT DOCUMENTS

| | | | |
|---|---|---|---|
| 2004/0267536 A1 | 12/2004 | Hershey et al. | |
| 2014/0037117 A1* | 2/2014 | Tsingos | H04S 5/005 381/303 |
| 2019/0081836 A1* | 3/2019 | Hadani | H04L 5/00 |

OTHER PUBLICATIONS

Jont B. Allen (Jun. 1977) "Short Time Spectral Analysis, Synthesis, and Modification by Discrete Fourier Transform", IEEE Transactions on Acoustics, Speech, and Signal Processing, ASSP-25 (3): 235-238.

Narasimha, M. Peterson, A. (Jun. 1978),"On the Computation of the Discrete Cosine Transform", IEEE Transactions on Communications. 26 (6): 934-936.

Delprat, N., Escudii, B., Guillemain, P., Kronland-Martinet, R., Tchamitchian, P., and Torrksani, B. (1992) "Asymptotic wavelet and Gabor analysis: extraction of instantaneous frequencies". IEEE Transactions on Information Theory. 38 (2): 644-664.

Brown, G.J. and Cooke, M.P. (1994) Computational auditory scene analysis. Computer Speech and Language, 8: 297-336.

Faheem Khan et al. "Speaker separation using Visually -derived Binary Masks", Aug. 29, 2013, Retrieved from the Internet: http://avsp2013.loria.fr/proceedings/papers/paper_24.pdf.

Hou Jen-Cheng et al: "Audio-visual speech enhancement using deep neural networks", 2016 Asia-Pacific Signal and Information Processing Association Annual Summit and Conference (APSIPA), Asia-Pacific Signal and Information Processing Association, Dec. 13, 2016, pp. 1-6.

Triantafyllos Afouras et al: "The conversation: Deep Audio-visual speech enhancement", Arxiv.org, Cornell University Library, 201 Olinlibrary Cornell University Ithaca, N, 14853, Apr. 11, 2018.

* cited by examiner (a) Spectrograms of two source voices.

1400

(b) Spectrogram of the mixed voices.

(c) Spectrograms of the separated voices.

METHOD AND SYSTEM FOR ENHANCING A SPEECH SIGNAL OF A HUMAN SPEAKER IN A VIDEO USING VISUAL INFORMATION

CROSS REFERENCE TO RELATED APPLICATIONS

This application claims priority from U.S. Provisional Patent Applications No. 62/528,225, filed Jul. 3, 2017; No. 62/586,472, filed Nov. 15, 2017; and No. 62/590,774, filed Nov. 27, 2017, all of which are incorporated herein by reference in their entireties.

FIELD OF THE INVENTION

The present invention relates generally to speech signal enhancement, and more particularly, to speech signal enhancement by removing acoustically unrelated sounds using visual information of face and mouth movements.

BACKGROUND OF THE INVENTION

When video is recorded in a studio, sound is clear of external noises and unrelated sounds. However, most video is not shot at studios. Voices of people shot in family events is mixed with music and with other voices. Video conferences from home or office are often disturbed by other people, ringing phones, or barking dogs. Television reporting from city streets is mixed with traffic noise, sound of winds, and the like.

Previous methods known in the art for single-channel, or monaural, speech separation usually use only audio signal as input. One of the main approaches is spectrographic masking, in which the separation model finds a matrix containing time-frequency (TF) components dominated by each speaker. The mask, or the filter, can be either binary or soft. One approach tackles the single-channel multi-speaker separation using a method known as deep clustering, in which discriminatively-trained speech embeddings are used as the basis for clustering, and subsequently separating, speech.
Audio-Visual Speech Processing Recent research in audiovisual speech processing makes extensive use of neural networks. Neural networks with visual input have been used for lipreading, sound prediction, and for learning unsupervised sound representations. Work has also been done on audio-visual speech enhancement and separation. One approach uses handcrafted visual features to derive binary and soft masks for speaker separation. Most known approaches describe a neural network that output a spectrogram representing the enhanced speech.

Different approaches exist for generation of intelligible speech from silent video frames of a speaker In an approach known as Vid2speech, presented by the inventors of the present invention in "ICASSP 2017—Vid2Speech: Speech Reconstruction from Silent Video" and other places, linear spectrograms representing speech from a sequence of silent video frames of a speaking person are generated. The Vid2speech model takes two inputs: a clip of K consecutive video frames showing the speaker face or part of the speaker's face, and a "clip" of (K+1) consecutive dense optical flow fields corresponding to the motion in (u;v) directions for pixels of consecutive frames.

The Vid2speech architecture consists of a dual-tower Residual neural network (ResNet) disclosed in an article by He, Kaiming, et al. titled: "Deep residual learning for image recognition" Published on CVPR. 2016, which takes the aforementioned inputs and encodes them into a latent vector representing the visual features. The latent vector is fed into a series of two fully connected layers followed by a post-processing network which aggregates multiple consecutive mel-scale spectrogram predictions and maps them to a linear-scale spectrogram representing the final speech prediction.

It is understood that any mentioning herein of the Vid2speech technique should not be interpreted as limiting and may include any other articulatory-to-acoustic mapping based on visual analysis.

SUMMARY OF THE INVENTION

Some embodiments of the present invention suggest using visual information of face and mouth movements as seen in the video to enhance the voice of a speaker, and in particular eliminate sounds that do not relate to the face movements. The method is based on spectral information of speech as predicted by a video-to-speech system.

Without visual information, the task of isolating a specific human voice while filtering out other voices or background noise is known as the cocktail party problem. In some cases, this problem is solvable when N voices are recorded by N microphones.

Speaker separation and speech enhancement are fundamental problems in speech processing and have been the subject of extensive research over the years, especially recently since neural networks were used successfully for this task. A common approach for these problems is to train a neural network to separate audio mixtures into their sources, leveraging on the network's ability to learn unique speech characteristics as spectral bands, pitches, chirps, etc. The main difficulty of audio-only approaches is their inability to separate similar human voices (typically same gender voices).

According to some embodiments of the present invention, a method for speech separation and isolation using audio-visual inputs is presented herein. In this case, a video showing the face or part of the face of the speaker is available in addition to the sound track. A case of separating a mixed speech of two visible speakers and continue with the isolation of the speech of a single visible speaker from background sounds shall be described hereinafter. This work builds upon recent advances in machine speechreading, which has the ability to learn auditory speech signals based on visual face motion.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
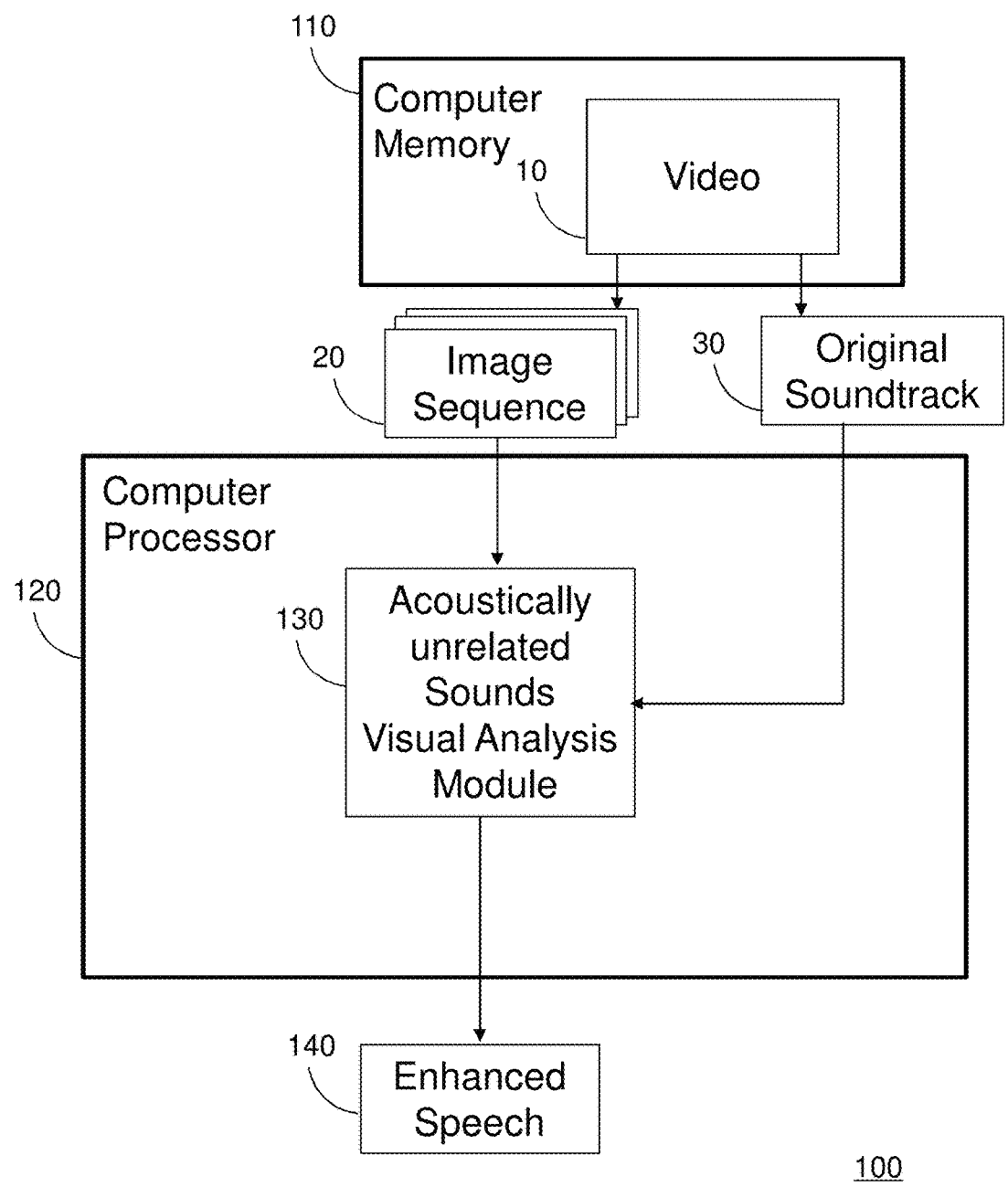
FIG. 1 is a block diagram illustrating non-limiting exemplary architecture of a system implementing a visual analysis module approach in accordance with some embodiments of the present invention.

It will be appreciated that, for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

Prior to the detailed description of the invention being set forth, it may be helpful to provide definitions of certain terms that will be used hereinafter.

The term "spectrogram" as used herein should be interpreted broadly to include any time-frequency representation two-dimension (2D) discrete time-frequency audio transforms (DTF) and may include, but is not limited to: Short-time Fourier Transform (STFT) disclosed by Jont B. Allen (June 1977) "Short Time Spectral Analysis, Synthesis, and Modification by Discrete Fourier Transform", IEEE Transactions on Acoustics, Speech, and Signal Processing, ASSP-25 (3): 235-238; Wavelet transform as disclosed by Narasimha, M. Peterson, A. (June 1978), "On the Computation of the Discrete Cosine Transform", IEEE Transactions on Communications. 26 (6): 934-936; Discrete Cosine Transform (DCT) as disclosed by Delprat, N., Escudii, B., Guillemain, P., Kronland-Martinet, R., Tchamitchian, P., and Torrksani, B. (1992) "Asymptotic wavelet and Gabor analysis: extraction of instantaneous frequencies". IEEE Transactions on Information Theory. 38 (2): 644-664, Cochleagram Brown, G. J. and Cooke, M. P. (1994) Computational auditory scene analysis. Computer Speech and Language, 8: 297-336, and many other transforms. It should be noted that these transforms can have real or complex values.

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

FIG. 1 is a block diagram illustrating a non-limiting exemplary architecture of a system implementing a visual analysis module approach in accordance with some embodiments of the present invention. System 100 may include a computer memory 110 configured to obtain a video 10, wherein video 10 may include: a sequence of images 20 showing a face or parts of a face of at least one human speaker, and an original soundtrack 30 corresponding with said video. System 100 may further include a computer processor 120 processing configured to process video 10, to yield an enhanced speech signal 140 of the at least one human speaker, using an acoustically unrelated sounds visual analysis module 130 configured to detect sounds that are acoustically unrelated to the speech of the at least one human speaker, wherein the detecting may be based on visual data derived from sequence of images 20 and original soundtrack 30.

Figure 2:
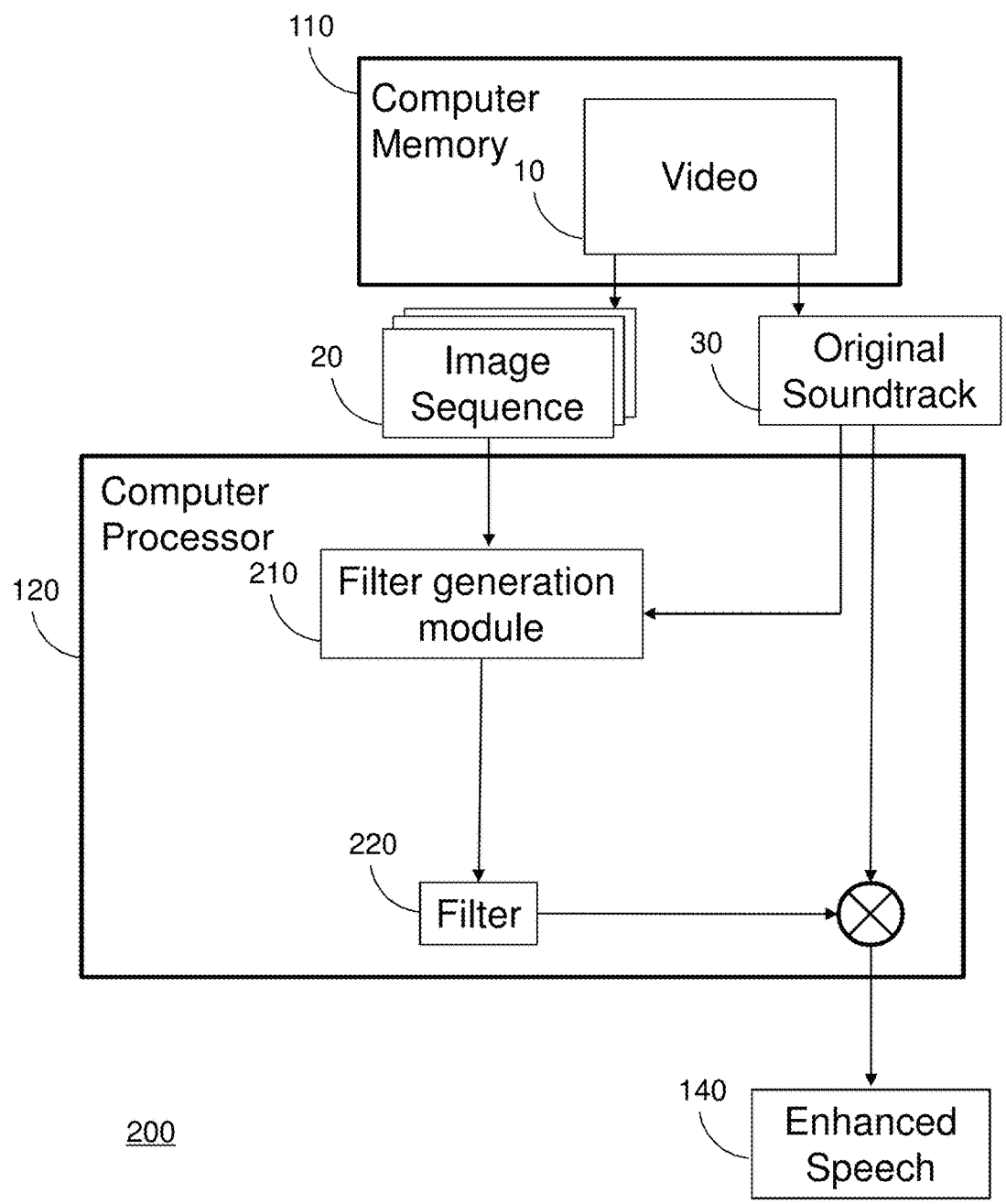
FIG. 2 is a block diagram illustrating non-limiting exemplary architecture of a system implementing a filter or mask approach in accordance with some embodiments of the present invention.

FIG. 2 is a block diagram illustrating a non-limiting exemplary architecture of a system implementing a filter or mask approach in accordance with some embodiments of the present invention. System 200 may include a computer memory 110 configured to obtain a video 10, wherein video 10 may include: a sequence of images 20 showing a face or parts of a face of at least one human speaker, and an original soundtrack 30 corresponding with said video. System 100 may further include a computer processor 120 configured to process video 10, to yield an enhanced speech signal 140 of the at least one human speaker, using filter generation module 210 configured to generate a filter 220 configured to remove sounds acoustically unrelated to the human speaker on sequence of images 20.

The filter approach starts with obtaining a video which includes: a sequence of images showing a face or parts of a face of one or more human speakers, and an original soundtrack corresponding with the video.

Then, using a computer processor, the video is processed to yield an enhanced speech signal of the at least one human speaker, by removing sounds that are acoustically unrelated to the speech of the one or more human speakers, wherein the removing is based on data derived from the sequence of images.

Figure 3:
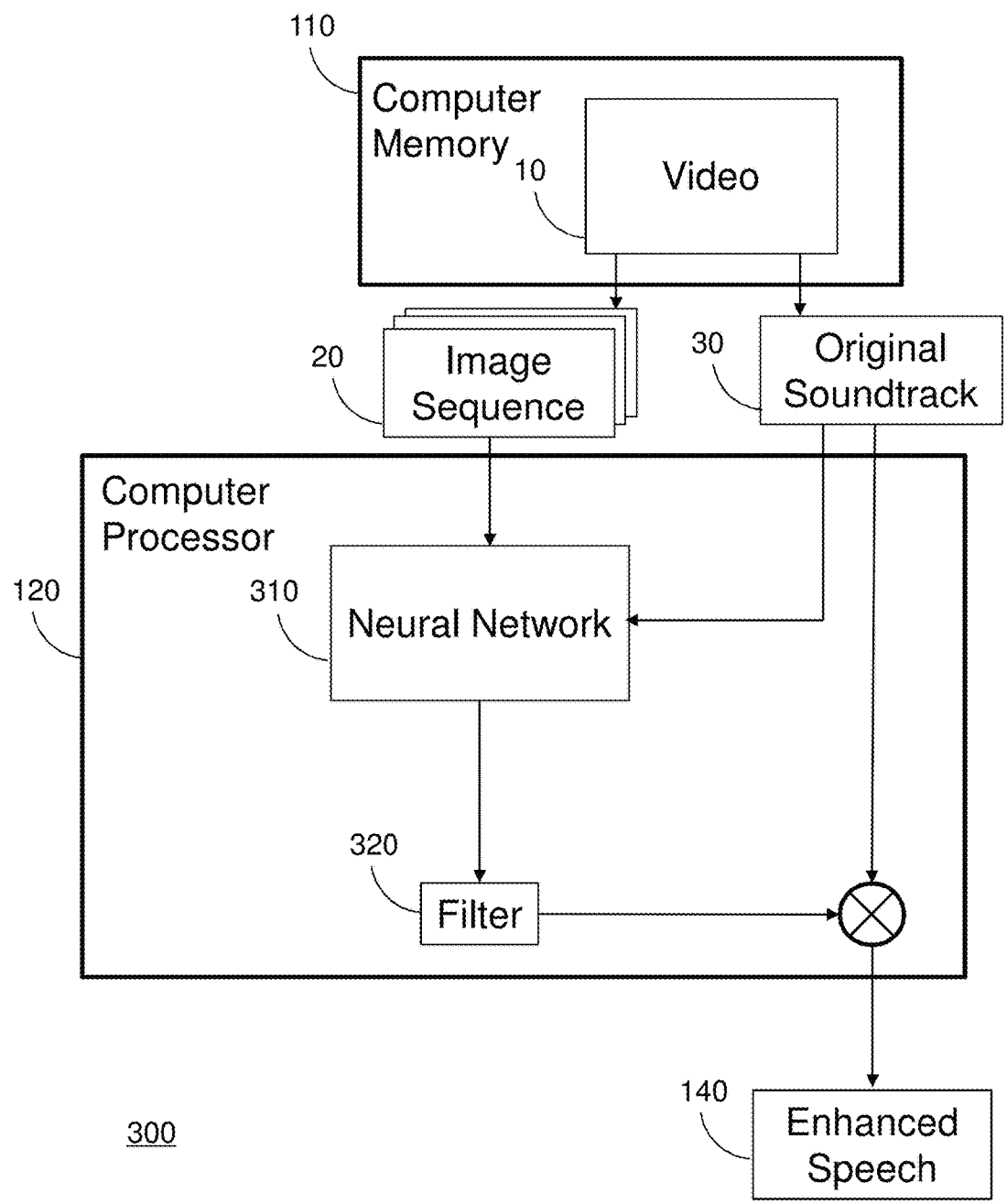
FIG. 3 is a block diagram illustrating non-limiting exemplary architecture of a system implementing a filter or mask approach using a neural network in accordance with some embodiments of the present invention.

FIG. 3 is a block diagram illustrating a non-limiting exemplary architecture of a system implementing a filter or mask approach using a neural network in accordance with some embodiments of the present invention. System 300 may include a computer memory 110 configured to obtain a video 10, wherein video 10 may include: a sequence of images 20 showing a face or parts of a face of at least one human speaker, and an original soundtrack 30 corresponding with said video. System 100 may further include a computer processor 120 configured to process video 10, to yield an enhanced speech signal 140 of the at least one human speaker, using neural network 310 which can either generate a filter 320 or simply detect the acoustically unrelated sounds as in system 100.

Figure 4:
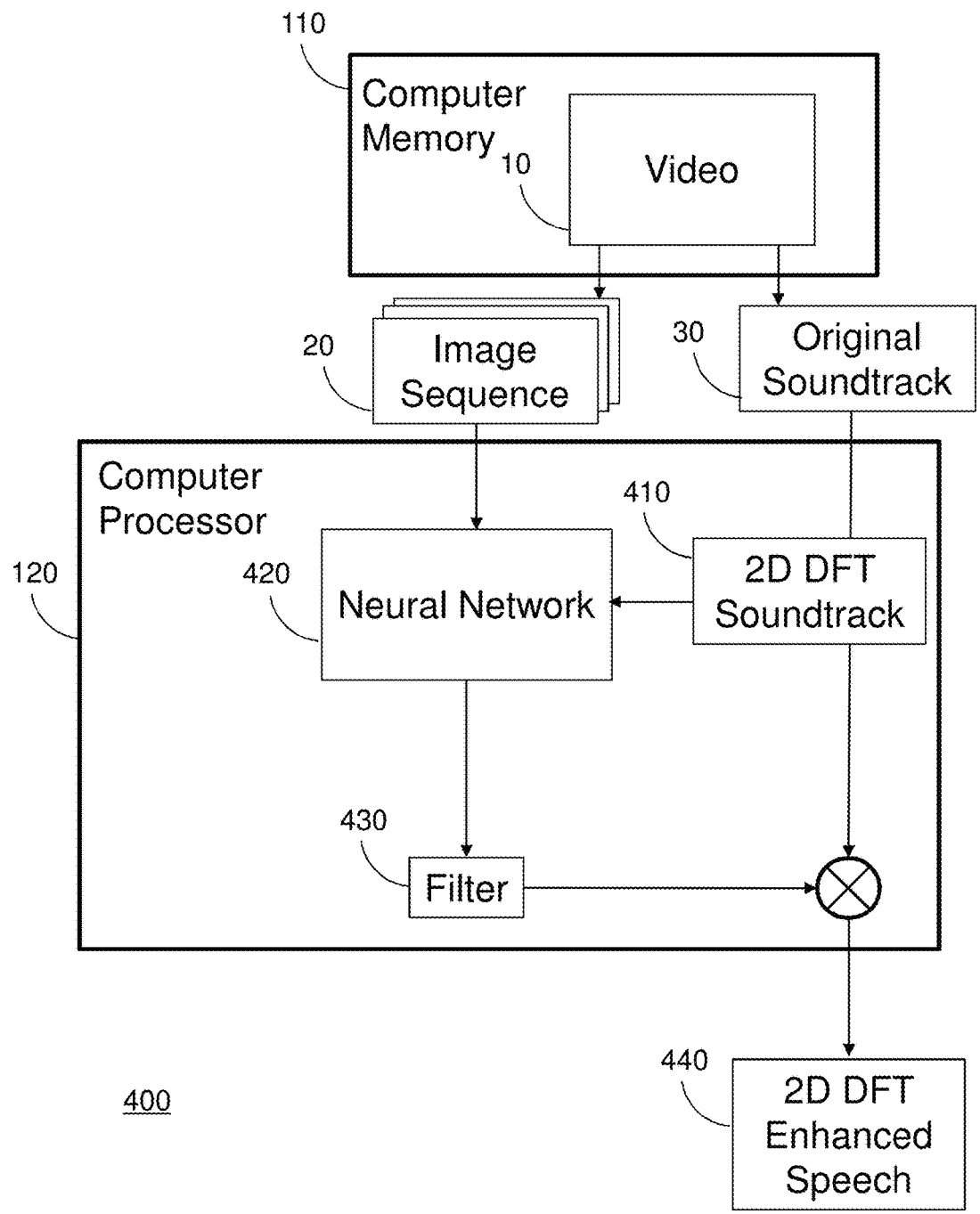
FIG. 4 is a block diagram illustrating another non-limiting exemplary architecture of a system implementing a filter or mask approach using a neural network in accordance with some embodiments of the present invention.

FIG. 4 is a block diagram illustrating another non-limiting exemplary architecture of a system implementing a filter or mask approach using a neural network in accordance with some embodiments of the present invention. System 400 is similar to system 300 with the addition that the original soundtrack and the enhanced speech signal are each represented respectively, by a two-dimensional (2D) discrete time-frequency (DTF) transform (410 and 440) in which each cell represents the amplitude and/or phase of said speech signal at a given frequency range at a given time range.

In accordance with some embodiments of the present invention, the original soundtrack and the enhanced speech signal are represented respectively by a first Short-Term Fourier Transform (STFT) or a spectrogram and a second STFT or a spectrogram.

In accordance with some embodiments of the present invention, the processing is carried out by generating a 2D filter and by pointwise multiplication of each cell in the 2D DTF of the original soundtrack by the corresponding cell of the 2D filter.

In accordance with some embodiments of the present invention, the 2D filter may be generated at least partly based on the original video.

In accordance with some embodiments of the present invention, the 2D filter may be generated using an articulatory-to-acoustic mapping having as an input said sequence of original input images.

Figure 5:
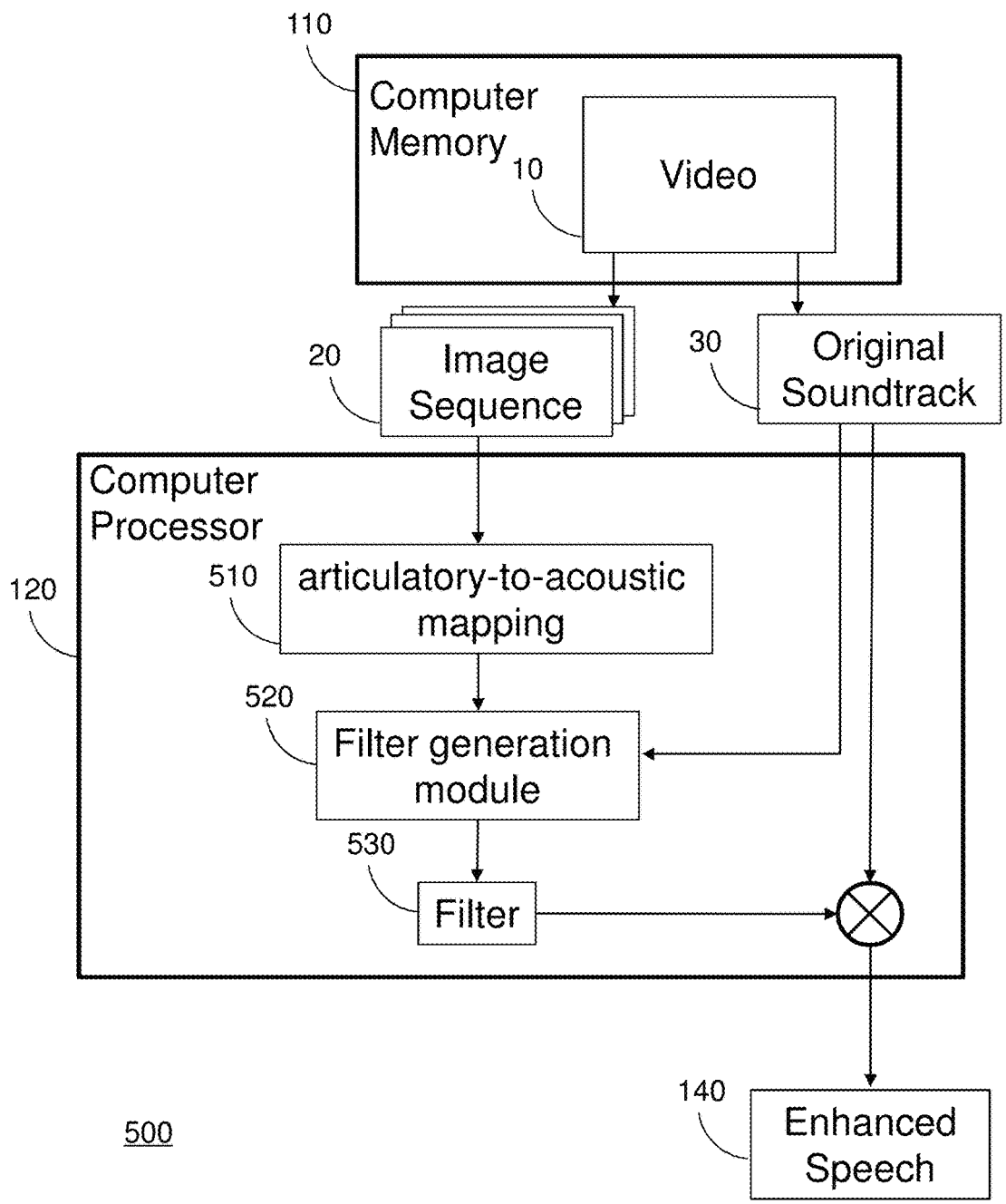
FIG. 5 is a block diagram illustrating another non-limiting exemplary architecture of a system implementing a filter or mask approach using a filter generation module utilizing an articulacy-to-acoustic mapping in accordance with some embodiments of the present invention.

In accordance with some embodiments of the present invention, the 2D filter is calculated, at least in part, using a neural network. The neural network may be trained on samples taken from the original video and from the clean speech signal FIG. 5 is a block diagram illustrating another non-limiting exemplary architecture of a system implementing a filter or mask approach using a filter generation module utilizing an articulacy-to-acoustic mapping in accordance with some embodiments of the present invention. System 500 is similar to system 200 but with an articulatory-to-acoustic mapping 510 feeding filter generation module 520 to generate filter 500.

Figure 6:
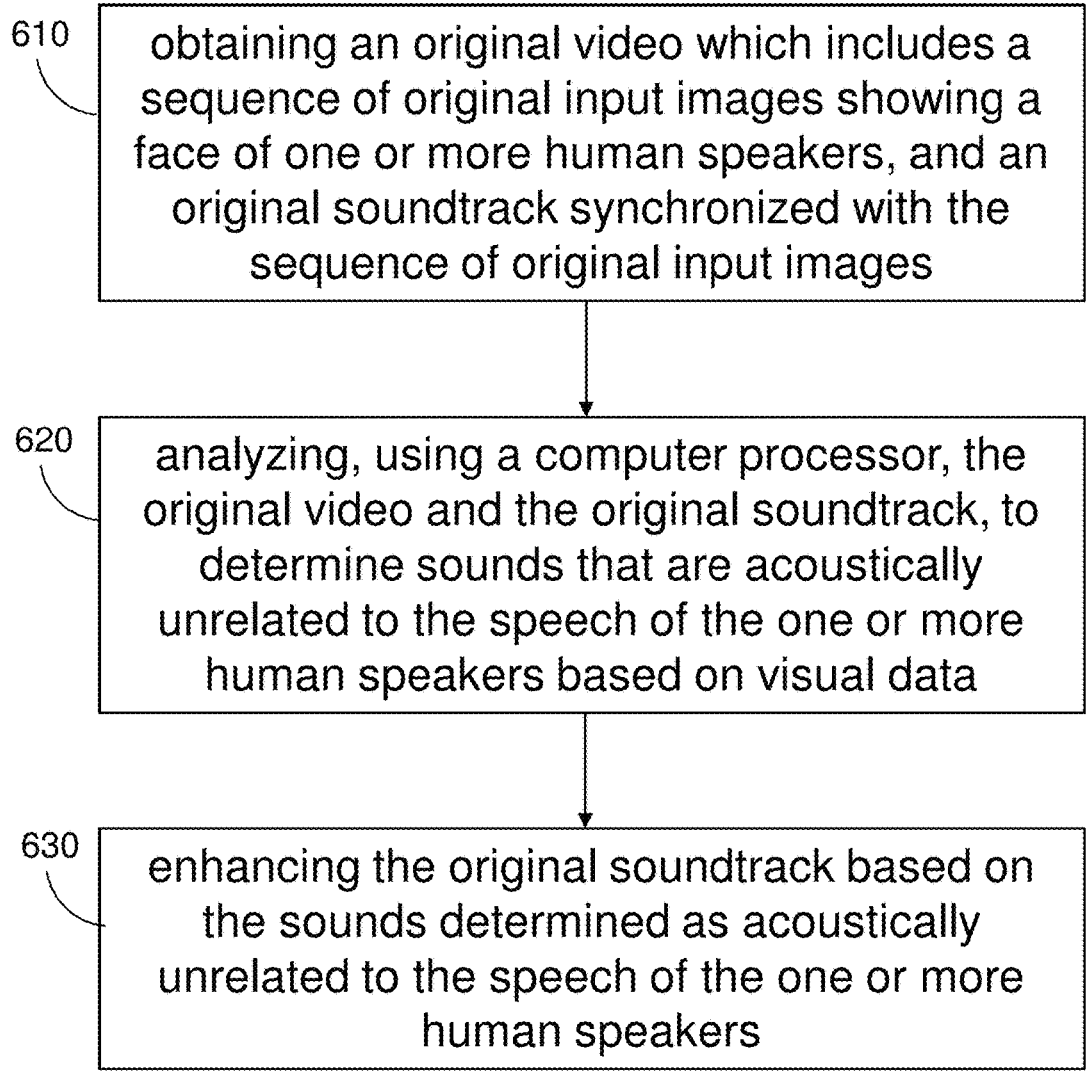
FIG. 6 is a high-level flowchart illustrating non-limiting exemplary method utilizing a visual analysis approach in accordance with some embodiments of the present invention.

FIG. 6 is a high-level flowchart illustrating a non-limiting exemplary method utilizing a visual analysis approach in accordance with some embodiments of the present invention. Method 600 may include the following steps: obtaining an original video which includes a sequence of original input images showing a face of one or more human speakers, and an original soundtrack synchronized with the sequence of original input images 610; analyzing, using a computer processor, the original video and the original soundtrack, to determine sounds that are acoustically unrelated to the speech of the one or more human speakers based on visual data 620; and enhancing the original soundtrack based on the sounds determined as acoustically unrelated to the speech of the one or more human speakers 630.

Figure 7:
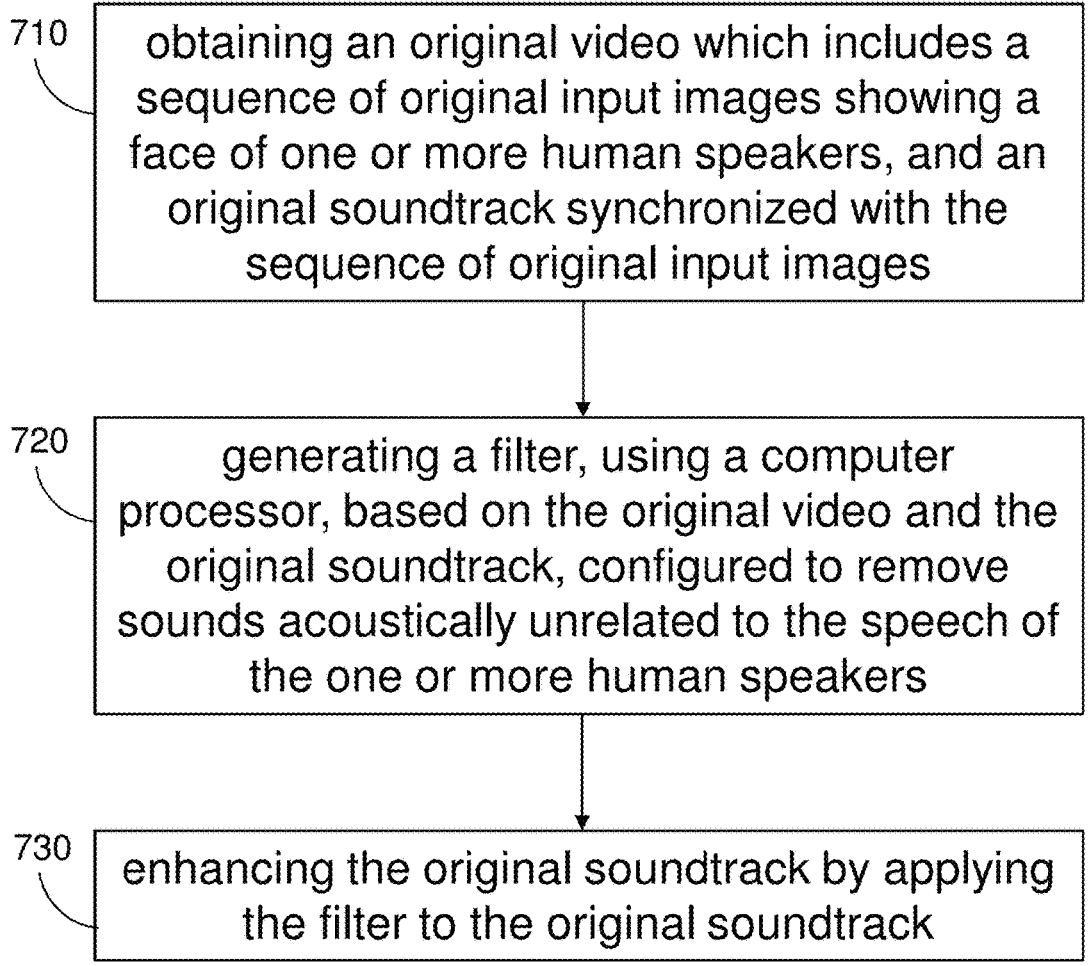
FIG. 7 is a high-level flowchart illustrating non-limiting exemplary method utilizing filter generation in accordance with some embodiments of the present invention.

FIG. 7 is a high-level flowchart illustrating a non-limiting exemplary method utilizing filter generation in accordance with some embodiments of the present invention. Method 700 may include the following steps: obtaining an original video which includes a sequence of original input images showing a face of one or more human speakers, and an original soundtrack synchronized with the sequence of original input images 710; generating a filter, using a computer processor, based on the original video and the original soundtrack, configured to remove sounds acoustically unrelated to the speech of the one or more human speakers 720; and enhancing the original soundtrack by applying the filter to the original soundtrack 730.

According to some embodiments of the present invention, an audio-visual end-to-end neural network model for separating the voice of a visible speaker from background noise is provided herein. Once the model is trained on a specific speaker, it can be used to enhance the voice of this speaker. It is assumed herein that a video showing the face of the target speaker is available along with the noisy soundtrack and use the visible mouth movements to isolate the desired voice from the background noise.

While the idea of training a deep neural network to differentiate between the unique speech or auditory characteristics of different sources can be very effective in several cases, the performance is limited by the variance of the sources. In accordance with some embodiments of the present invention, using the visual information leads to significant improvement in the enhancement performance in different scenarios. In order to cover cases where the target and background speech cannot be totally separated using the audio information alone, it has been suggested by inventors of the present invention to add to the training data videos with synthetic background noise taken from the voice of the target speaker. With such videos in the training data, the trained model better exploits the visual input and generalizes well to different noise types.

The speech enhancement neural network model gets two inputs: (i) a sequence of video frames showing the mouth of the speaker; and (ii) a spectrogram of the noisy audio. The output is a spectrogram of the enhanced speech. The network layers are stacked in encoder-decoder fashion.

Exemplary Implementation of the End-to End Approach

Figure 8:
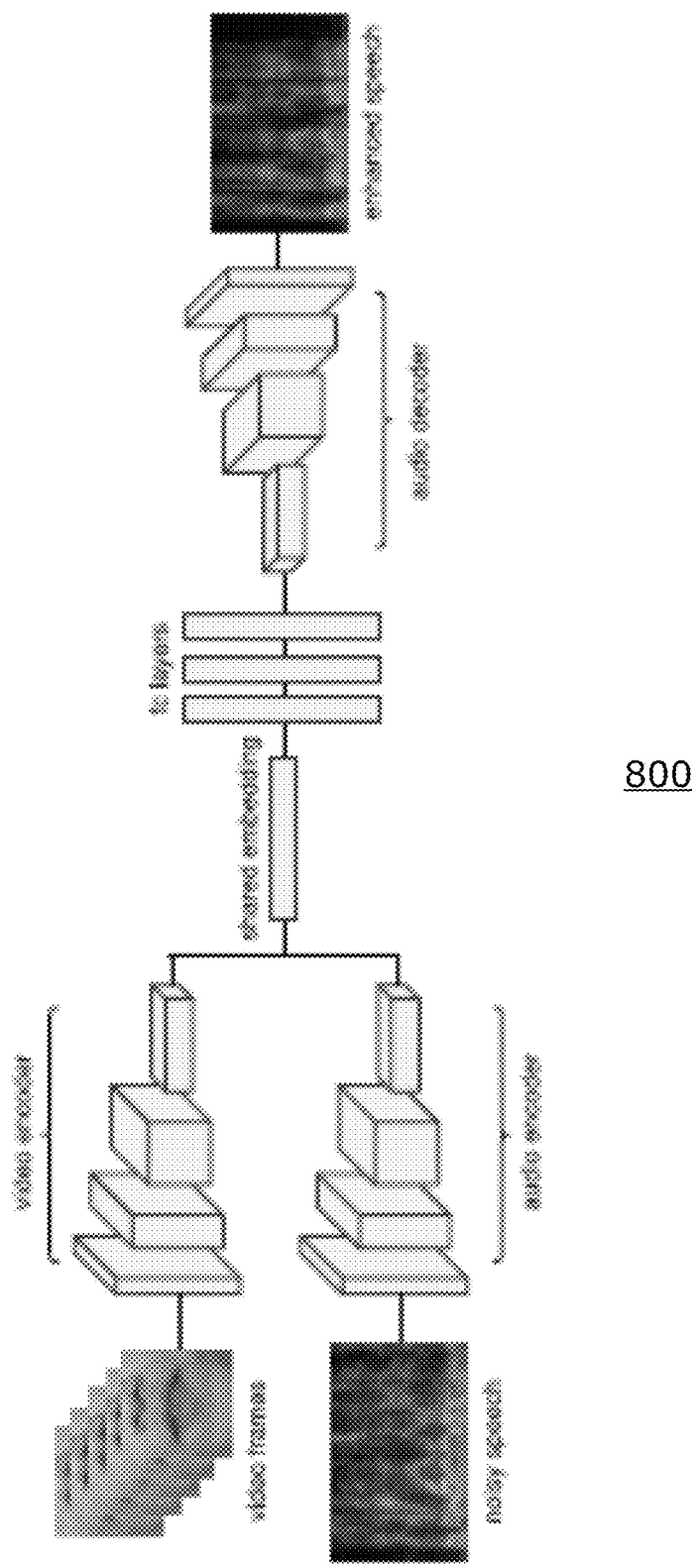
FIG. 8 is a block diagram illustrating non-limiting exemplary architecture of a system implementing an end-to-end approach in accordance with some embodiments of the present invention.

FIG. 8 is a block diagram illustrating a non-limiting exemplary architecture of one system in implementing an end-to-end approach in accordance with some embodiments of the present invention. The encoder module consists of a dual tower Convolutional Neural Network which takes the video and audio inputs and encodes them into a shared embedding representing the audio-visual features. The decoder module consists of transposed convolutional layers and decodes the shared embedding into a spectrogram representing the enhanced speech. The entire model is trained end-to-end.

Video Encoder

The input to the video encoder is a sequence of five (5) consecutive gray scale video frames of size 128 cropped and centered on the mouth region. While using five (5) frames worked well, other number of frames might also work. The video encoder has six (6) consecutive convolution layers. Each layer is followed by Batch Normalization, Leaky-ReLU for non-linearity, max pooling, and Dropout of 0.25.

Audio Encoder

Both input and output audio are represented by log mel-scale spectrograms having 80 frequency intervals between 0 to 8 kHz and 20 temporal steps spanning 200 ms. As previously done in several audio encoding networks, we design our audio encoder as a convolutional neural network using the spectrogram as input. The network consists of 5 convolution layers. Each layer is followed by Batch Normalization and Leaky-ReLU for non-linearity. Stride convolutions is used instead of max pooling in order to maintain temporal order.

Detailed Architecture of the Video and Audio Encoders (Shared Representation)

The video encoder outputs a feature vector having 2,048 values, and the audio encoder outputs a feature vector of 3,200 values. The feature vectors are concatenated into a shared embedding representing the audio-visual features, having 5,248 values. The shared embedding is then fed into a block of three (3) consecutive fully-connected layers, of sizes 1,312, 1,312 and 3,200, respectively. The resulting vector is then fed into the audio decoder.

Audio Decoder

The audio decoder consists of five (5) transposed convolution layers, mirroring the layers of the audio encoder. The last layer is of the same size as the input spectrogram, representing the enhanced speech.

Optimization

The network is trained to minimize the mean square error loss between the output spectrogram and the target speech spectrogram. In the exemplary implementation, Adam optimizer is used with an initial learning rate for back propagation. Learning rate is decreased by 50% once learning stagnates, i.e., the validation error does not improve for five (5) epochs.

Multi-Modal Training

Neural networks with multi-modal inputs can often be dominated by one of the inputs Different approaches have been considered to overcome this issue in previous work. In order to enforce using the video features, adds an auxiliary video output that should resemble the input.

The inventors of the present invention have enforced the exploitation of visual features by introducing a new training strategy. Data samples where the added noise is the voice of the same speaker were included in the training. Since separating two overlapping sentences spoken by the same person is very difficult using audio only information, the network is forced to exploit the visual features in addition to the audio features. It has been shown by some embodiments of the present invention that a model trained using this approach generalizes well to different noise types and is capable to separate target speech from indistinguishable background speech.

The corresponding audio signal is resampled to 16 kHz. Short-Time-Fourier-Transform (STFT) is applied to the waveform signal. The spectrogram (STFT magnitude) is used as input to the neural network, and the phase is kept aside for reconstruction of the enhanced signal. We set the STFT window size to 640 samples, which equals to 40 milliseconds and corresponds to the length of a single video frame. We shift the window by hop length of 160 samples at a time, creating an overlap of 75%. Log mel-scale spectrogram is computed by multiplying the spectrogram by a mel-spaced filterbank. The log mel-scale spectrogram comprises 80 mel frequencies from 0 to 8000 Hz. We slice the spectrogram to pieces of length 200 milliseconds corresponding to the length of five (5) video frames, resulting in spectrograms of size 80×20: 20 temporal samples, each having 80 frequency bins.

An end-to-end neural network model, separating the voice of a visible speaker from background noise, has been presented. Also, an effective training strategy for audio-visual speech enhancement was proposed—using as noise overlapping sentences spoken by the same person. Such training builds a model that is robust to similar vocal characteristics of the target and noise speakers and makes an effective use of the visual information.

The proposed model consistently improves the quality and intelligibility of noisy speech and outperforms previous methods on two public benchmark datasets. Finally, we demonstrated for the first time audio-visual speech enhancement on a general dataset not designed for lipreading research. Our model is compact, and operates on short speech segments, and thus suitable for real-time applications. On average, enhancement of 200 ms segment requires 36 ms of processing (using NVIDIA Tesla M60 GPU).

Some embodiments of the present invention provide a new approach for generating speech from silent video frames. Instead of feeding a voice generation system with raw video frames, only descriptors based on Visual Geometry Group (VGG)-Face will be used for speech generation. This parameter reduction substantially accelerates training. In some cases, it even proved to give better results. The inventors have used the pre-trained VGG-Face network to generate face descriptors of a speaker as a preliminary step. The last three fully connected VGG layers are omitted, giving a descriptor length of 512, a common approach to extracting a face descriptor from VGG.

Figure 9:
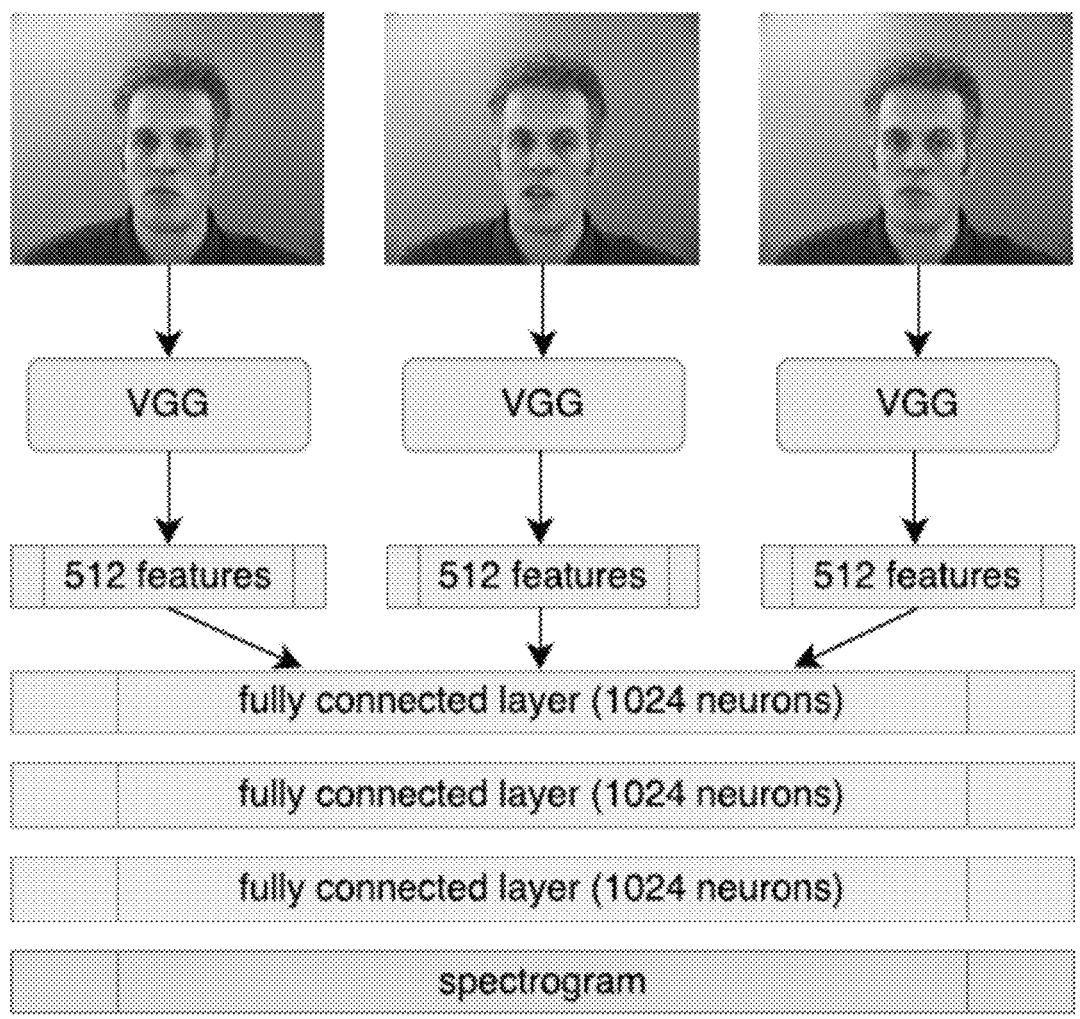
FIG. 9 is a block diagram illustrating non-limiting exemplary architecture of a system in accordance with some embodiments of the present invention.

The sequence of descriptors from each frame is fed as input into another neural network mapping it to the predicted speech spectrogram, as seen in FIG. 9. The number of frames in a batch depends on the dataset. In our experiments we selected number of frames such that their duration spans 330 ms. The network has three (3) fully connected layers of 1024 neurons each and an output layer representing the speech mel-scaled spectrogram. The spectrogram comprises 128 frequencies from 0 to 8 kHz (human voice frequency band ranges from approximately 20 Hz to 10000 Hz).

Exemplary Implementation of the Filter Approach Based on Visual Data

In accordance with some other embodiments of the present invention, an approach of decomposing the mixed audio signal (comprising two or more competing signals) into a spectrogram in order to assign each time-frequency (TF) element to its respective source is provided. These assignments are used as a masking function to extract the dominant parts of each source. The masked spectrograms are subsequently reconstructed into the estimated source signals.

The assignment operation is facilitated by obtaining speech spectral information of each speaking person using any articulacy to acoustic method known in the art, that may include, but not limited to, the two different video-to-speech methods mentioned in Vid2speech and VGG-Face.

Since the video-to-speech methods do not generate a perfect speech signal, the inventors have used use their predicted speech only to generate masks which can be used to isolate appropriate components of the noisy mixture, as will be described later.

Separating Two Speakers

In this scenario, there are two speakers (D1, D2) facing a camera with a single microphone. We assume that the speakers are known, and that we can train in advance two separate video-to-speech model, (N1, N2). N1 is trained using the audio-visual dataset of speaker D1, and N2 is trained using the audio-visual dataset of speaker D2.

Figure 10:
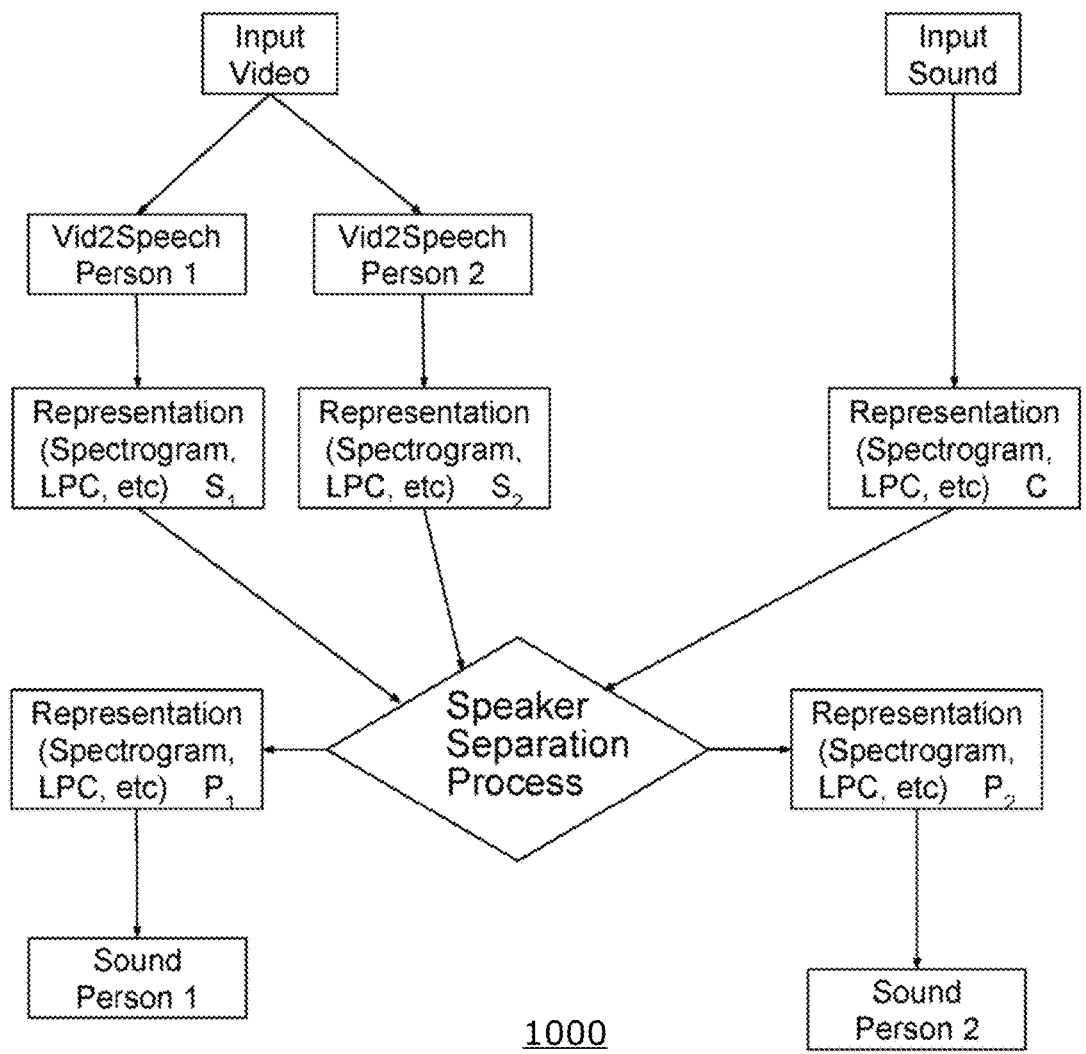
FIG. 10 is a high-level flowchart illustrating another non-limiting exemplary method in accordance with some embodiments of the present invention.
Figure 11:
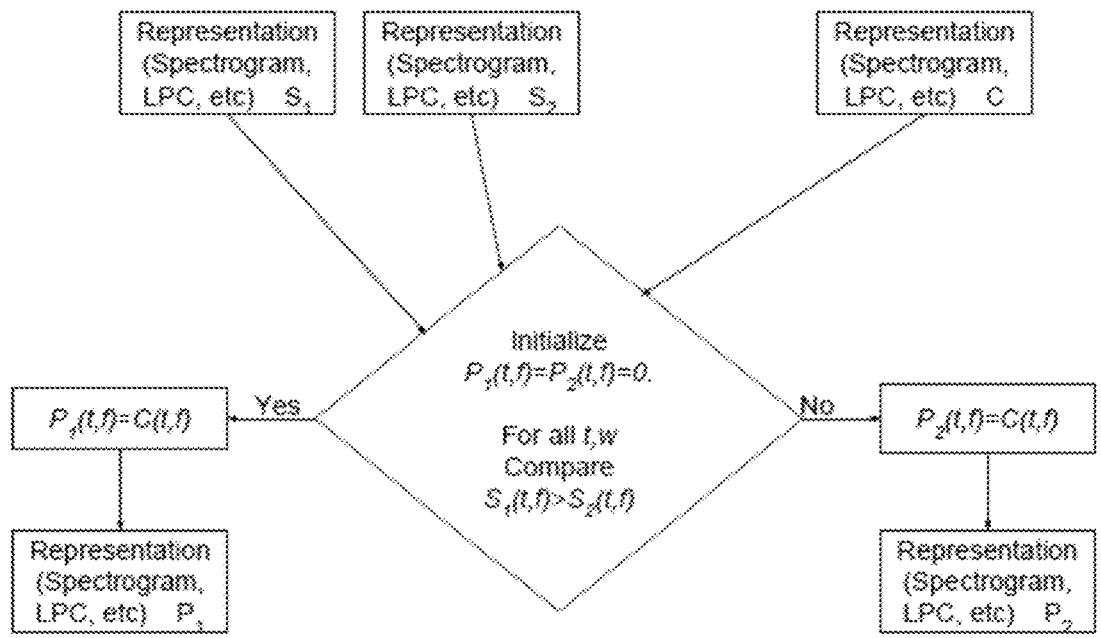
FIG. 11 is a high-level flowchart illustrating yet another non-limiting exemplary method in accordance with some embodiments of the present invention.

Given a new sequence of video frames, along with a synchronized sound track having the mixed voices of speakers D1 and D2, the separation process is as follows. The process is shown in FIG. 10 and in FIG. 11.
1. The faces of speakers D1 and D2 are detected in the input video using a face detection method.
2. The speech mel-scaled spectrogram S1 of speaker D1 is predicted using network N1 with the face-cropped frames as input.
3. The speech mel-scaled spectrogram S2 of speaker D2 is predicted using network N2 with the face-cropped frames as input.
4. The mixture mel-scaled spectrogram C is generated directly from the audio input.
5. The mixture spectrogram C is split into two individual spectrograms P1 and P2, guided by the visually predicted spectrograms S1 and S2, as follows:
For each (t; f), if S1(t; f)>S2(t; f) then P1(t; f)=C(t; f) and P2(t; f)=0,
Otherwise P1(t; f)=0 and P2(t; f)=C(t; f).
6. The separated speech of each person is reconstructed from the corresponding mel-scaled spectrogram, P1 or P2, constructed in the previous step.

It should be noted that this simple separation method, where "winner takes all", can be modified. For example, in-stead of the binary decision used in Step 5 above, a softmax function can be used as follows: Two masks, F1 and F2, are computed from the visually predicted spectrograms such that F1(t; f)+F2(t; f)=1:

$$F_1(t, f) = \sqrt{\frac{S_1^2(t, f)}{S_1^2(t, f) + S_2^2(t, f)}}$$

$$F_2(t, f) = \sqrt{\frac{S_2^2(t, f)}{S_1^2(t, f) + S_2^2(t, f)}}$$

The individual mel-scaled spectrograms for the two speakers can be generated from the mixture spectrogram C using the following masks:

P1=C×F1; P2=C×F2, where × denotes element-wise multiplication.

Speech Enhancement of a Single Speaker

In the speech enhancement scenario, one speaker (D) is facing the camera, and his voice is recorded with a single microphone. Voices of other (unseen) speakers, or some background noise, is also recorded. The task is to separate the voice of the speaker from the background noise. We assume that the speaker is previously known, and that we can train a network (N) of a video-to-speech model mentioned above on the audio-visual dataset of this speaker.

Figure 12:
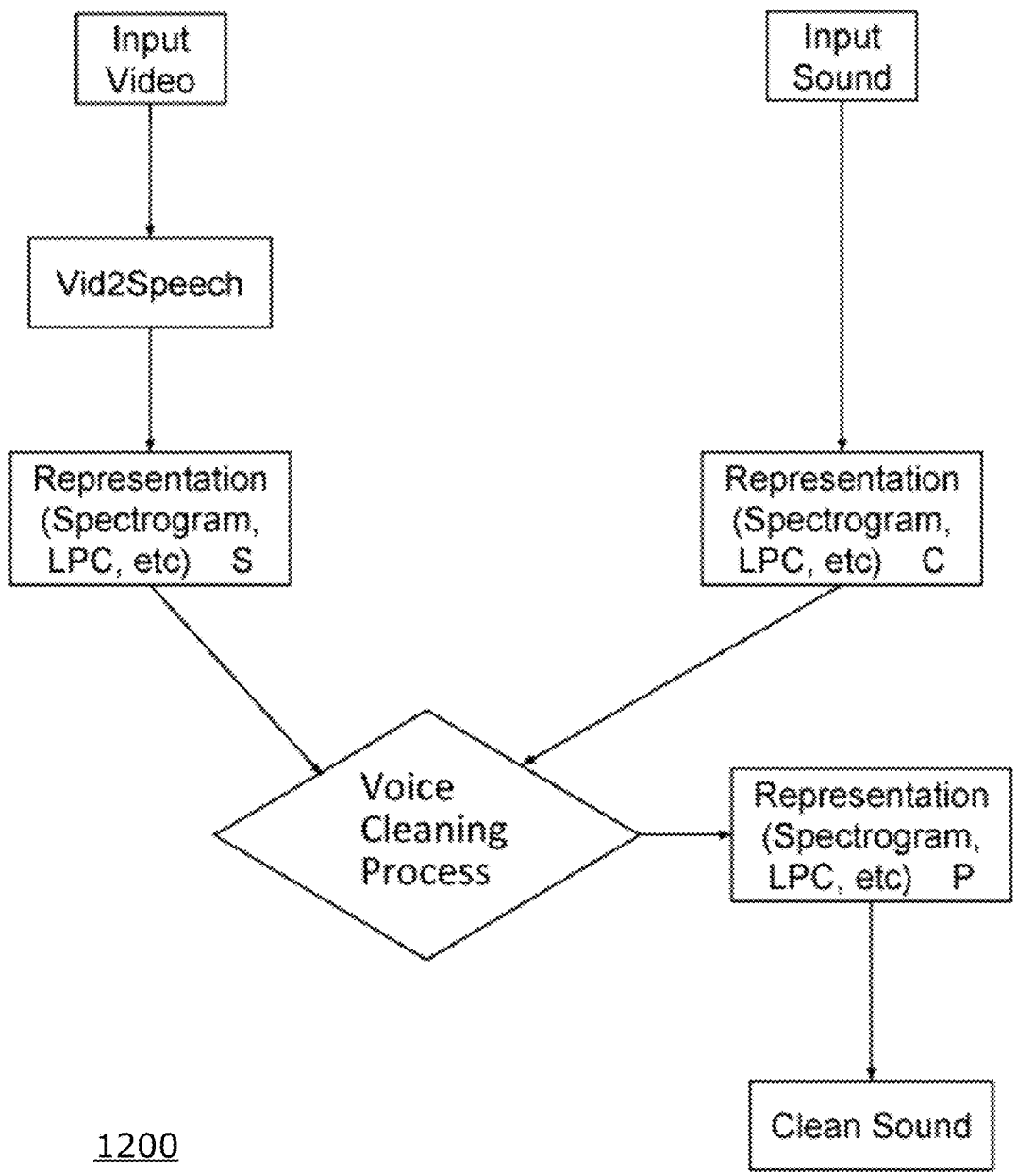
FIG. 12 is a high-level flowchart illustrating yet another non-limiting exemplary method in accordance with some embodiments of the present invention.
Figure 13:
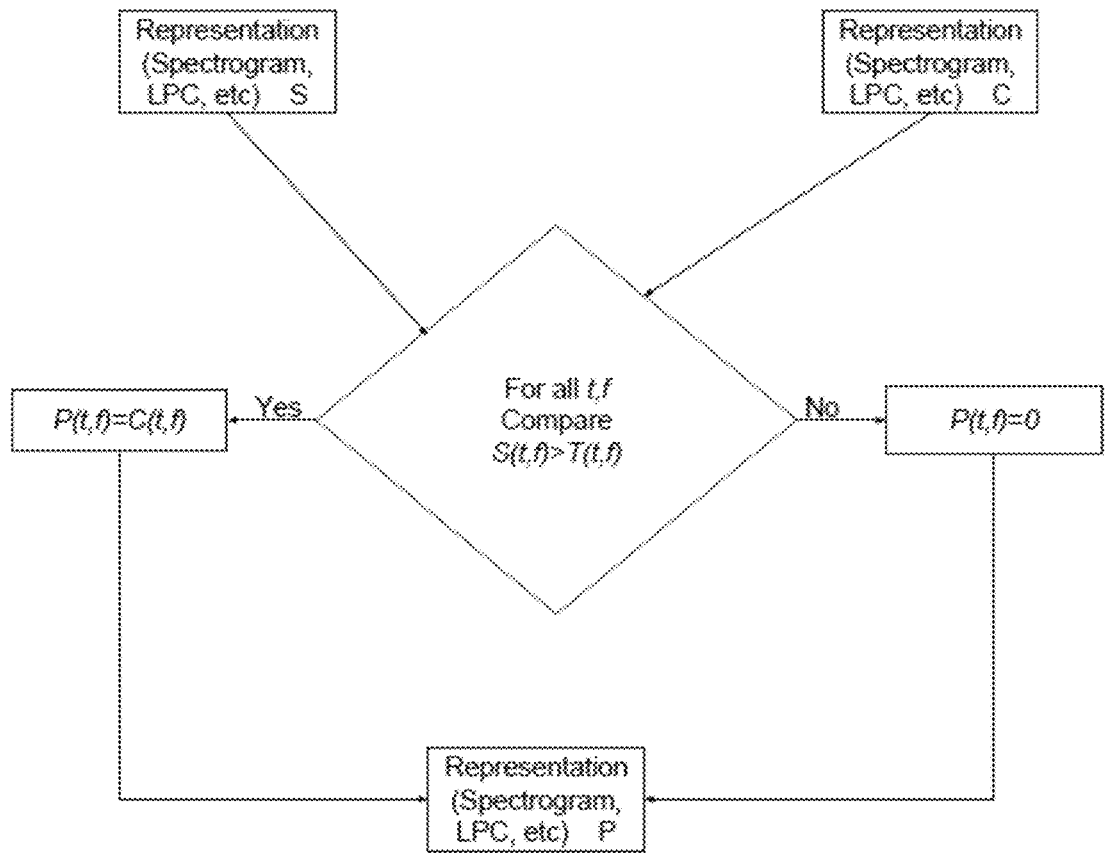
FIG. 13 is a high-level flowchart illustrating a method in accordance with some embodiments of the present invention.

Given a new sequence of video frames of the same speaker, along with a synchronized noisy sound track, the process to isolate the speaker's sound is as follows. A diagram of this process is shown in FIG. 12 and in FIG. 13.
1. The face of speaker D is detected in the input video using a face detection method.
2. The speech mel-scale spectrogram S of the speaker D is predicted using network N with the face-cropped frames as input.
3. The mixture mel-scale spectrogram C is generated directly from the audio input.
4. A separation mask F is constructed using thresholding where τ is the desired threshold: For each (t; f) in the spectrogram, the following formula can be computed:

$$F(t, f) = \begin{cases} 1 & S(t, f) > \tau \\ 0 & \text{otherwise} \end{cases} \quad (3)$$

The threshold τ can be determined in advance or can be learned during training.
5. The isolated mel-scaled spectrogram is filtered by the following masking: P=C×F, where × denotes element-wise multiplication.
6. The speaker's clean voice is reconstructed from the predicted mel-scale spectrogram P.

As in the voice separation case, it should be noted that the voice isolation method can be modified, and similar results will be obtained. For example, instead of a binary decision based on a threshold τ as in Step 4 above, the mask F can have continuous values between zero and one as given by a softmax, or another similar function.

Experiments

In order to test some embodiments of the present invention, the inventors have carried out various experiments on databases. It is understood that the following experiments serve merely as technical enablers for some embodiments of the present invention and should not be regarded as limiting the scope of the present invention.

Base experiments were carried out on the GRID audio-visual sentence corpus, a large dataset of audio and video (facial) recordings of 1,000 sentences spoken by 34 people (18 male, 16 female). Each sentence consists of a sequence of six words, e.g., "Place green at H 7 now". A total of 51 different words are contained in the GRID corpus. Videos have a fixed duration of three (3) seconds at a frame rate of 25 FPS with a resolution of 720_576 pixels, resulting in sequences comprising 75 frames.

In order to better demonstrate the capability of the method in accordance with some embodiments of the present invention, further experiments were performed on the TCDTIMIT dataset. This dataset consists of 60 volunteer speakers with around 200 videos each, as well as three lip speakers, people specially trained to speak in a way that helps the deaf understand their visual speech. The speakers are recorded saying various sentences from the TIMIT dataset and are recorded using both front-facing and 30-degree cameras. The experiments on this dataset show how unintelligible video-to-speech predictions can still be exploited to produce high quality speech signals using our proposed methods.

Testing the methods proposed by the inventors of the present invention requires an audio-visual dataset of multiple persons speaking simultaneously in front of a camera and a single microphone. Lacking a dataset of this kind, we use the datasets described above while generating artificial instantaneous audio mixtures from the speech signals of several speakers, assuming the speakers are hypothetically sitting next to each other. Given audio signals s1 (t); . . . sn(t) of the same length and sample rate, their mixture signal is assumed to be:

$$\sum_{i=1}^{n} \alpha S_i(t)$$

wherein α denotes any multiplier such as 1, 1/n or the like.

Audio spectrogram manipulation Generation of spectrogram may be done by applying short-time-Fourier-transform (STFT) to the waveform signal. Mel-scale spectrogram is computed by multiplying the spectrogram by a mel-spaced filterbank. Waveform reconstruction is done by multiplying the mel-scale spectrogram by the pseudo-inverse of the melspaced filterbank followed by applying the inverse STFT. The original phase may be used or an estimation of the phase may be used by applying the Griffin-Lim algorithm.

The results of the experiments of the inventors are evaluated using objective quality measurements commonly used for speech separation and enhancement. Needless to say, in addition to the measurements we will describe next, we assessed the intelligibility and quality of our results using informal human listening.

Enhancement Evaluation

The inventors have used the Perceptual evaluation of speech quality (PESQ) which is an objective method for end-to-end speech quality assessment originally developed for narrow-band telephone networks and speech codecs. Although it is not perfectly suitable to our task, we use it for rough comparison.

Separation Evaluation

The inventors have used the BSS Eval toolbox to measure the performance of our source separation methods, providing the original source signals as ground truth. The measures are based on the decomposition of each estimated source signal into a number of contributions corresponding to the target source, interference from unwanted sources and artifacts. The evaluation consists of three different objective scores: SDR (Source to Distortion Ratio), SIR (Source to Interferences Ratio) and SAR (Source to Artifacts Ratio).

Ideal Mask (Filter)

Knowing the ground truth of the source signals, we can set up a benchmark for our methods known as the "ideal mask". Using the spectrograms of the source signals as the ideal predictions by a video-to-speech system we can estimate a performance ceiling of each approach. The inventors refer to this baseline later evaluating the results.

In the following experiments, we will refer to the speakers from the GRID corpus by their IDs in the dataset: 2, 3 and 5 (all male).

Speech Enhancement

In this experiment, we trained a network of one of the video-to-speech models mentioned in 2 on the audio-visual data of speaker 2. Then, we synthesized mixtures of unseen samples from speaker 2 and speaker 3, and applied speech enhancement to denoise the sentences spoken by speaker 2. The training data consisted of randomly selected sentences, comprising 80% of the samples of speaker 2 (40 minutes length in total).

Speech Separation

Figure 14:
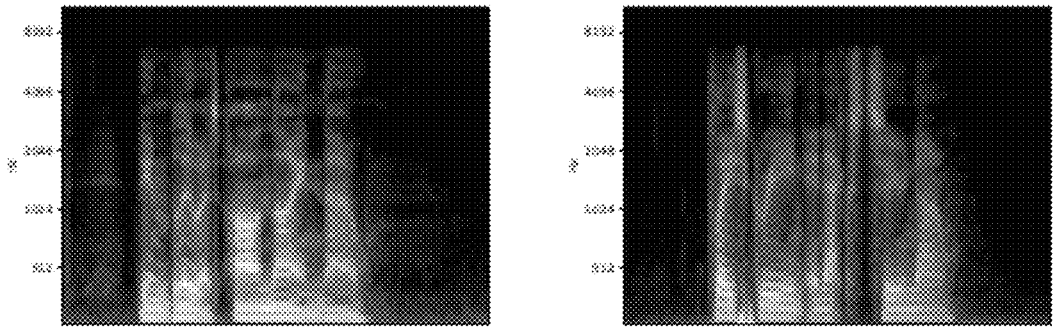
FIG. 14 illustrates spectrograms of the enhanced speech signal in accordance with some embodiments of the present invention.
Figure 14:
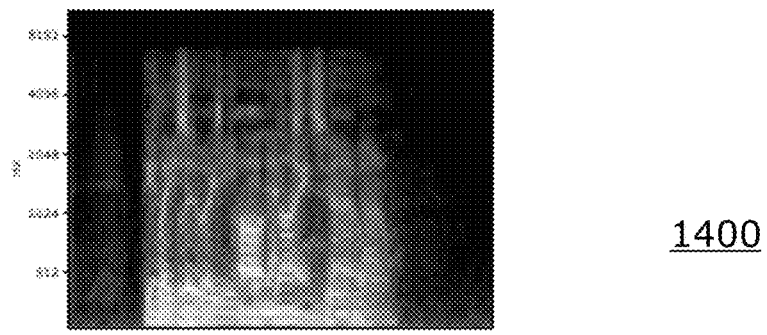
Figure 14:
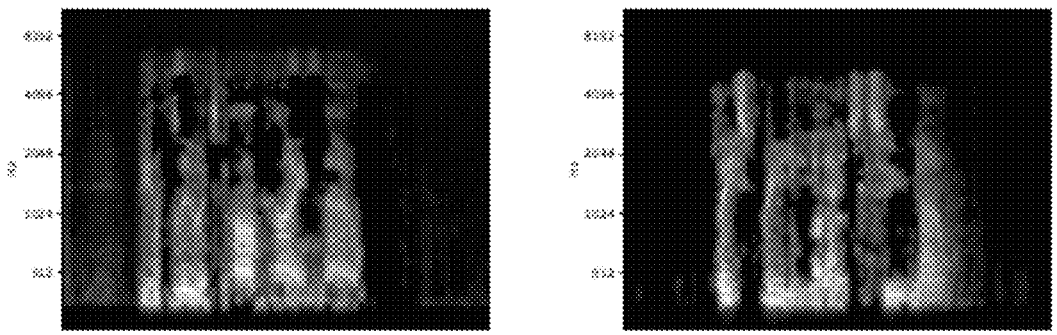

In this experiment, the inventors trained two of the video-to-speech models mentioned in 2 on the audio-visual data of speakers 2 and 3, separately. Then, we synthesized mixtures of unseen sentences from speakers 2 and 3, and applied speech separation. The training data consisted of randomly selected sentences, comprising 80% of the samples of each of the speakers (40 minutes length in total). Examples of the separated spectrograms are shown in FIG. 14.

Source Separation vs. Raw Speech Predictions

A naïve approach to source separation would be to use the raw speech predictions generated by a video-to-speech model as the separated signals without applying any of our separation methods.

This approach leads to reasonable results when dealing with a constrained-vocabulary dataset such as GRID. However, it usually generates low quality and mostly unintelligible speech predictions when dealing with a more complicated dataset such as TCD-TIMIT, which contains sentences from a larger vocabulary. In this case, our separation methods have real impact, and the final speech signals sound much better than the raw speech predictions.

Hypothetical Same-speaker Separation

In order to emphasize the power of exploiting visual information in speech separation, the inventors of the present invention have conducted a non-realistic experiment of separating two overlapping sentences spoken by the same person (given the corresponding video frames separately). The experiment was performed in a similar fashion to the previous one, replacing speaker 3 with another instance of speaker 2.

Multi-speaker Speech Separation

The separation method of two speaking persons has been described above. This can be easily generalized to a separation method of n speaking persons. Training N different networks separately as well, as constructing n masks is straightforward.

Speech Separation of Unknown Speakers

In this experiment, it was attempted to separate the speech of two unknown speakers, 3 and 5. First, a vid2speech network was trained on the audio-visual data of speaker 2. The training data consisted of randomly selected sentences, comprising 80% of the samples of speaker 2 (40 minutes length in total).

Before predicting the speech of each one of the speakers as required in the separation methods, we fine-tuned a network using 10% of the samples of the actual speaker (5 minutes length in total). Then, we applied the speech separation process to the synthesized mixtures of unseen sentences. The results are summarized in Table 5, along with a comparison to separation using VGG-Face as a baseline.

To implement the method according to some embodiments of the present invention, a computer processor may receive instructions and data from a read-only memory or a random-access memory or both. At least one of aforementioned steps is performed by at least one processor associated with a computer. The essential elements of a computer are a processor for executing instructions and one or more memories for storing instructions and data. Generally, a computer will also include, or be operatively coupled to communicate with, one or more mass storage devices for storing data files. Storage modules suitable for tangibly embodying computer program instructions and data include all forms of non-volatile memory, including by way of example semiconductor memory devices, such as EPROM, EEPROM, and flash memory devices and magneto-optic storage devices.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in base band or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, RF, etc., or any suitable combination of the foregoing.

Computer program code for carrying out operations for aspects of the present invention may be written in any combination of one or more programming languages, including an object-oriented programming language such as Java, Smalltalk, C++, Python or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or portion diagrams of methods, apparatus (systems) and computer program products according to embodiments of the invention. It will be understood that each portion of the flowchart illustrations and/or portion diagrams, and combinations of portions in the flowchart illustrations and/or portion diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or portion diagram portion or portions.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or portion diagram portion or portions.

The computer program instructions may also be loaded onto a computer, other programmable data processing apparatus, or other devices to cause a series of operational steps to be performed on the computer, other programmable apparatus or other devices to produce a computer implemented process, such that the instructions, which execute on the computer or other programmable apparatus, provide processes for implementing the functions/acts specified in the flowchart and/or portion diagram portion or portions.

The aforementioned flowchart and diagrams illustrate the architecture, functionality, and operation of possible implementations of systems, methods and computer program products according to various embodiments of the present invention. In this regard, each portion in the flowchart or portion diagrams may represent a module, segment, or portion of code, which comprises one or more executable instructions for implementing the specified logical function(s). It should also be noted that, in some alternative implementations, the functions noted in the portion may occur out of the order noted in the figures. For example, two portions shown in succession may, in fact, be executed substantially concurrently, or the portions may sometimes be executed in the reverse order, depending upon the functionality involved. It will also be noted that each portion of the portion diagrams and/or flowchart illustration, and combinations of portions in the portion diagrams and/or flowchart illustration, can be implemented by special purpose hardware-based systems that perform the specified functions or acts, or combinations of special purpose hardware and computer instructions.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

Advantageously, the control of machinery or the interface to any computer-controlled device can greatly benefit from the enhanced speech signal described herein in accordance with embodiments of the present invention. Control of machinery, such as machines in a factory or control of cars is an important use case, and control by speech is particularly important as it is natural mode of communication for people. However, the recognition of speech may be difficult in a noisy environment such as in a factory, or in an environment including multiple people such as a car. In a car, for example, the car should follow the instructions of a designated person only, and not that of another passenger. When the car is equipped with a camera that can be directed to the face of the designated driver, the control of the car can be limited so that only this person can control the car. This can be done using both the sounds recorded by a microphone, plus the video showing the driver's face, to isolate the sound of the driver and provide accurate and safe car control. Voice input, recording speech and human computer interface (HCI) in noisy and multiple speaker environments will also benefit from the single specific user generated clean sound achievable from utilizing a video of the lips of the person talking.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional elements.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A method of enhancing a speech signal of a target human speaker, the method comprising:
   obtaining a video, wherein said video comprises a sequence of images showing a face or parts of a face of the target human speaker, and an original soundtrack corresponding with said video;
   representing said original soundtrack by a two-dimensional (2D) discrete time-frequency (DTF) audio transform;
   generating a 2D time-frequency filter, having same dimensions as said 2D DTF audio transform, by analyzing said video;
   obtaining a filtered DTF audio transform by point-wise multiplying the 2D DTF audio transform by said 2D time-frequency filter; and
   generating an enhanced speech signal based on said filtered DTF audio transform, wherein said enhanced speech signal exhibits a removal, from the original soundtrack, of sounds that are unrelated to the speech of said target human speaker.

2. The method according to claim 1, wherein said DTF audio transform is a Short-Term Fourier Transform (STFT) or a spectrogram.

3. The method according to claim 1, wherein said generating of the 2D time frequency filter is carried out, at least in part, using a neural network.

4. The method according to claim 1, wherein said 2D time-frequency filter is generated using an articulatory-to-acoustic mapping having as an input said sequence of original input images.

5. The method according to claim 3, wherein the neural network is trained on a set of videos having respective clean speech signals.

6. The method according to claim 1, wherein said enhanced speech signal exhibits less noise compared with the original soundtrack.

7. The method according to claim 1, wherein said enhanced speech signal exhibits a better speaker separation of said target human speaker from another speaker included in the original soundtrack, compared with the original soundtrack.

8. The method according to claim 1, wherein the sounds that are unrelated to the speech of said target human speaker comprise background sounds.

9. The method according to claim 8, wherein the background sounds are unrelated to movements of the face or the part of the face of the target human speaker.

10. The method according to claim 1, further comprising using the enhanced speech signal for control by speech of a computer-controlled device.

11. The method according to claim 10, wherein said computer-controlled device comprises a vehicle.

12. A system for enhancing a speech signal of a target human speaker, the system comprising:
- a computer memory configured to obtain a video, wherein said video comprises a sequence of images showing a face or parts of a face of the target human speaker, and an original soundtrack corresponding with said video; and
- a computer processor configured to:
  - represent said original soundtrack by a two-dimensional (2D) discrete time-frequency (DTF) audio transform;
  - generate a 2D time-frequency filter, having same dimensions as said 2D DTF audio transform, by analyzing said video;
  - obtain a filtered DTF audio transform by point-wise multiplying the 2D DTF audio transform by said 2D time-frequency filter; and
  - generate an enhanced speech signal based on said filtered DTF audio transform, wherein said enhanced speech signal exhibits a removal, from the original soundtrack, of sounds that are unrelated to the speech of said target human speaker.

13. The system according to claim 12, wherein said DTF audio transform is a Short-Term Fourier Transform (STFT) or a spectrogram.

14. The system according to claim 12, wherein said generating of the 2D time frequency filter is carried out, at least in part, using a neural network.

15. The system according to claim 12, wherein said 2D time-frequency filter is generated using an articulatory-to-acoustic mapping having as an input said sequence of original input images.

16. The system according to claim 14, wherein the neural network is trained on a set of videos having respective clean speech signals.

17. The system according to claim 12, wherein said enhanced speech signal exhibits less noise compared with the original soundtrack.

18. The system according to claim 12, wherein said enhanced speech signal exhibits a better speaker separation of said target human speaker from another speaker included in the original soundtrack, compared with the original soundtrack.

19. A non-transitory computer readable medium for enhancing a speech signal of a target human speaker, the non-transitory computer readable medium comprising a set of instructions that when executed cause at least one computer processor to: represent said original soundtrack by a two-dimensional (2D) discrete time-frequency (DTF) audio transform; generate a 2D time-frequency filter, having same dimensions as said 2D DTF audio transform, by analyzing said video; obtain a filtered DTF audio transform by point-wise multiplying the 2D DTF audio transform by said 2D time-frequency filter; and generate an enhanced speech signal based on said filtered DTF audio transform, wherein said enhanced speech signal exhibits a removal, from the original soundtrack, of sounds that are unrelated to the speech of said target human speaker.

20. The non-transitory computer readable medium according to claim 19, wherein said DTF audio transform is a Short-Term Fourier Transform (STFT) or a spectrogram.

21. The non-transitory computer readable medium according to claim 19, wherein said generating of the 2D time frequency filter is carried out, at least in part, using a neural network.

22. The non-transitory computer readable medium according to claim 19, wherein said 2D time-frequency filter is generated using an articulatory-to-acoustic mapping having as an input said sequence of original input images.

23. The non-transitory computer readable medium according to claim 21, wherein the neural network is trained on a set of videos having respective clean speech signals.

24. The non-transitory computer readable medium according to claim 19, wherein said enhanced speech signal exhibits less noise compared with the original soundtrack.

* * * * *